United States Patent [19]

Greenawalt et al.

[11] 3,977,685
[45] Aug. 31, 1976

[54] ROTATING BELLOWS SEAL

[75] Inventors: Robert G. Greenawalt, Barrington; Edward J. Swann, Charlestown, both of R.I.

[73] Assignee: EG&G, Inc., Wellesley, Mass.

[22] Filed: Nov. 5, 1974

[21] Appl. No.: 521,082

[52] U.S. Cl. ................................ 277/89; 277/74
[51] Int. Cl.² .................................. F16J 15/36
[58] Field of Search ................. 277/88, 89, 90, 42, 277/74

[56] References Cited
UNITED STATES PATENTS

| 1,820,100 | 8/1931 | Thompson | 277/89 X |
| 2,464,988 | 3/1949 | Payne | 277/88 X |
| 3,226,467 | 12/1965 | Kienel et al. | 277/58 X |
| 3,277,927 | 10/1966 | Schneider | 277/88 X |
| 3,356,378 | 12/1967 | Tracy | 277/88 X |
| 3,658,349 | 4/1972 | Stevens | 277/89 |

FOREIGN PATENTS OR APPLICATIONS

| 463,169 | 2/1950 | Canada | 277/89 |

Primary Examiner—Samuel B. Rothberg
Attorney, Agent, or Firm—Ralph L. Cadwallader; Leo M. Kelly; Laurence R. Hefter

[57] ABSTRACT

An improved rotating bellows seal is disclosed which includes a bellows core having an annular mounting plate at one end adapted to drivingly and sealingly engage a shaft and a bellows seal ring on the other end to sealingly engage a mating seal ring. The mating and bellows seal rings are provided with conical inside diametral surfaces to prevent leakage fluids from entering the bellows core.

16 Claims, 3 Drawing Figures

ROTATING BELLOWS SEAL

BACKGROUND OF THE INVENTION

This invention relates to axial mechanical seals and, more particularly, to rotating bellows seals particularly adapted for high speed applications.

A rotating bellows seal is an axial mechanical seal in which a bellows is used to replace a spring to apply an axial force to hold the sealing surfaces together and to provide secondary sealing between rotating members. Bellows seals commonly are formed of two primary elements, namely a bellows adapted to be connected to a rotating shaft and a stationary mating seal ring adapted to be attached to a housing or casing in which the shaft is mounted. The bellows applies the axial force to cause the bellows seal and mating seal ring to sealingly engage one another in order to minimize leakage at the position where the rotary shaft enters the casing.

Conventional bellows seals are relatively expensive and their use generally has been restricted to special environments where other lesser expensive seals are inadequate. Conventional bellows seals utilize a relatively expensive sleeve and mounting means for drivingly and sealingly attaching the bellows core to a shaft. It has also been found that fluids which it is desired to contain within the casing tend to migrate or leak through the sealing interface between the rotary and stationary members and if the fluid migrates into the interior of the bellows core or accumulates at the sealing interface, it can have a detrimental effect on the seal's effectiveness and life span.

Accordingly, it is the objective of this invention to provide an improved rotary bellows seal which is relatively inexpensive to manufacture and install and which has an increased life span in comparison with prior bellows seals.

BRIEF DESCRIPTION OF THE INVENTION

To achieve the foregoing objectives and in accordance with the purpose of the invention, as embodied and broadly described herein, the rotating bellows seal of this invention comprises an annular bellows core having an annular plate at one end adapted to be drivingly mounted on a shaft, a bellows seal ring mounted on the other end of the core, the inside diameter of the seal ring being slightly larger than the shaft to provide clearance between the seal ring and the shaft, and a mating seal ring adapted to sealingly engage the bellows seal ring.

Preferably, the bellows seal ring includes a metal member attached to the bellows core and a seal face attached to the metal member, the seal face being of non-metallic material. However, if the mating seal ring is non-metallic, the bellows seal face can be formed by the metal member. It is also preferred that the inside diameter of the metal member is larger than the inside diameter of the bellows seal face.

Another preferred form is for the mating seal ring to have an inside diameter which is tapered in a direction away from the bellows seal ring to provide an increasing inside diameter.

The invention consists in the novel parts, constructions, arrangements, combinations and improvements shown and described. The accompanying drawing, which is incorporated in and constitutes a part of the specification, illustrates two embodiments of the invention and, together with the description, serves to explain the principles of the invention.

Additional objectives and advantages of the invention will be set forth in part in the description which follows, and in part will be obvious from the description, or may be learned by practice of the invention. The objectives and advantages of the invention may be realized and attained by means of the instrumentalities and combinations particularly pointed out in the appended claims.

DETAILED DESCRIPTION OF THE INVENTION

Reference will be made in detail to the present preferred embodiments of the invention, an example of which is illustrated in the accompanying drawing.

Figure 1:
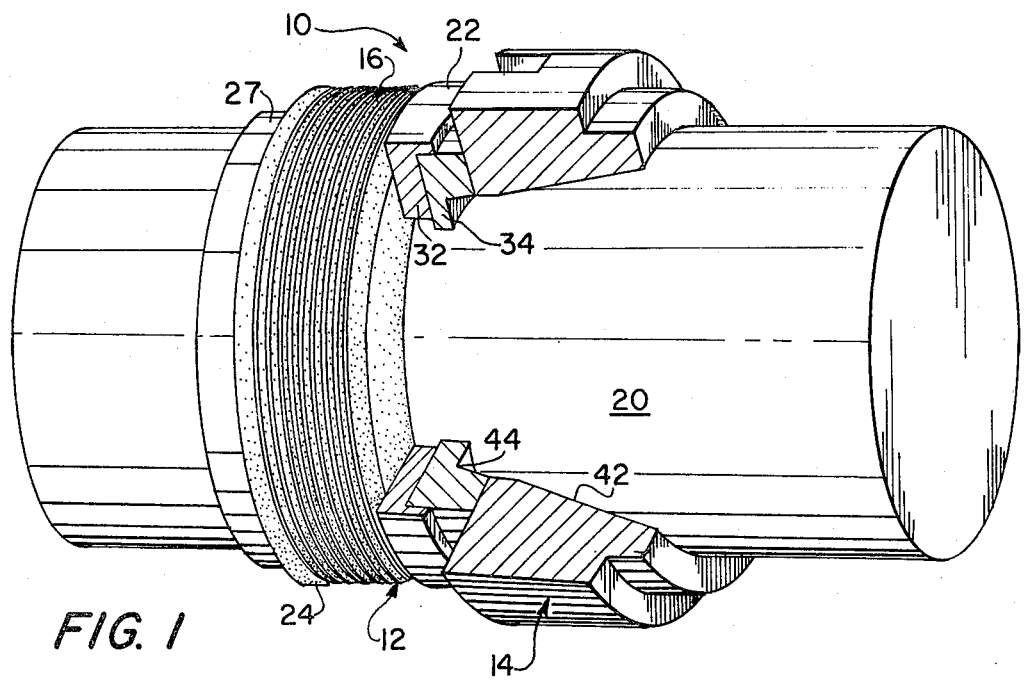
FIG. 1 is a partially cutaway perspective view of an improved bellows seal formed in accordance with this invention.
Figure 2:
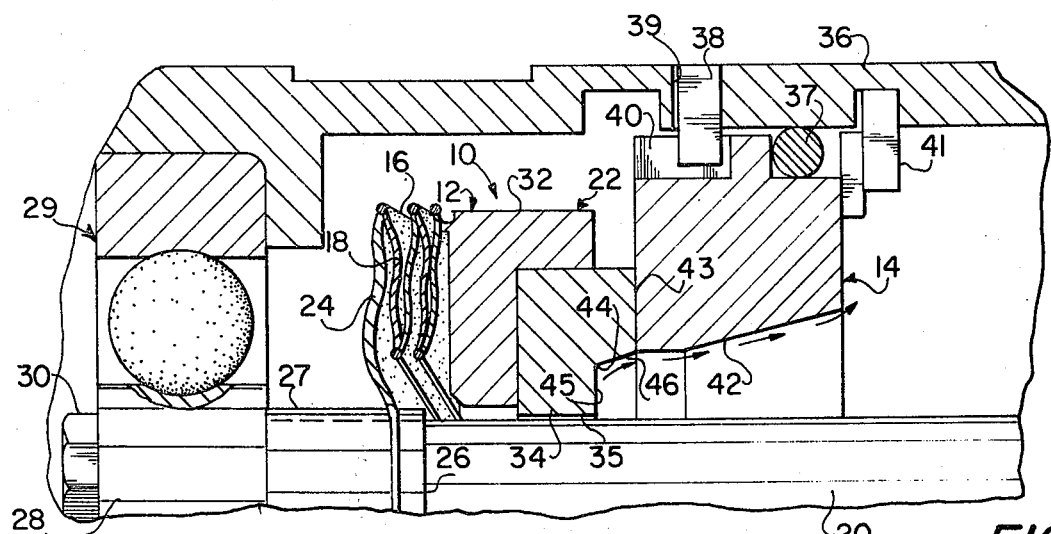
FIG. 2 is a sectional view of the bellows seal of FIG. 1 shown mounted on a shaft within a casing.

Referring now to FIGS. 1 and 2, there is illustrated a rotary bellows seal 10 formed of two primary elements, the first element being a combined rotary bellows core and seal ring 12 and the second element being a stationary mating ring 14. The rotary bellows core and seal ring 12 includes a bellows core 16 which can be formed of a series of wave-shaped annular disks or plates 18 welded together alternately at opposite ends, namely at their outside and inside diametral surfaces. The plates are formed of a spring metal selected in accordance with the environment to which it will be exposed. For example, in a corrosive or high temperature environment stainless steel or Hastelloy are suitable materials.

In accordance with this invention, means are provided at one end of the bellows core 16 to mount the bellows core to a rotary shaft 20 so that rotation of the shaft effects rotation of the combined bellows core and seal ring 12. As here embodied, a single, heavy annular end plate 24 is attached to one end of the bellows core 16. The plate 24 may be formed from the same material and tooling as the bellows core plates 18; however, a heavier gage metal is used. As an example of relative suitable dimensions, the core plates 18 can have a 0.006 inch gage while the end plate 24 can have a 0.020 inch gage.

The annular end plate 24 is adapted to be mounted on the shaft 20 by any suitable relatively inexpensive means. One suitable mounting means is to provide the shaft with a shoulder 26, which can be formed as part of the shaft or which can be provided by a sleeve (not shown) fixedly attached to the shaft. The annular end plate 24 is then slipped over the shaft 20 and abutted against the shoulder 26. A clamping sleeve 27 is mounted on the shaft 20 and clamped the end plate 24 against the shoulder 26 for forming a driving and static sealing connection between the shaft 20 and the bellows core 16. If desired, a gasket can be used between the plate 24 and shoulder 26 to ensure proper sealing. The sleeve 27 can be held in clamping position by any suitable means, such as by the inner race 28 of a ball bearing 29 which, in turn, is forcibly held against the sleeve 27 by a retaining nut 30 or other conventional means.

At the other end of the bellows core 16 is mounted a bellows seal ring 22. As here embodied the bellows seal ring 22 includes a metal member or base 32 and an annular seal face 34 is attached to the base 32. The base 32 is fixedly attached to the bellows core 16 such as by welding the base to the first core plate 18. The seal face 34 preferably is formed of a material which has different characteristics than the base 32. For example, the base 32 can be formed of a metal such as stainless steel or Hastelloy while the seal face can be formed of a carbon graphite or other suitable material depending upon the particular application of the bellows seal.

Bellows seals have a tendency to vibrate in use. The vibration is of three principal types, namely axial vibration produced by axial motion of the shaft, torsional vibration produced by friction between the sealing surfaces of the bellows seal ring and the mating seal ring and radial vibration. Because of the vibration, the seal ring 12 may contact the shaft 20. To avoid damage to the seal and the shaft, which could result if the metal base 32 contacted the shaft, the inside diameter of the metal base 32 is larger than the inside diameter of the non-metallic bellows seal face 34, as can be seen in FIG. 2. Consequently, any contact made between the bellows seal and the shaft will take place along the inside diametral surface 35 (or pilot diameter) of the seal face 34. By maintaining the diametral clearance between the seal face 34 and the shaft relatively small, such as approximately 0.005 inch, damping of the radial vibration is provided. Being able to maintain a small clearance also assures the desired diametral alignment between the seal face 34 and the mating seal ring 14.

The mating seal ring 14 is attached to the casing 36 in which the shaft 20 is mounted in a manner as to prevent rotational movement of the mating seal ring 14. In many applications, the drag provided by a conventional packing, for example, an O-ring 37 is sufficient to prevent rotation of the mating seal ring 14. Of course, the O-ring 37 is utilized between the mating seal ring 14 and the casing 36 to prevent leakage. In other applications, preventing rotation of the mating seal ring 14 can be accomplished by any conventional means, such as an anti-rotational pin 38 which is inserted through an aperture 39 in the casing 36 and which is received in a slot 40 in the mating seal ring 14. Locking rings 41 can be used to lock the mating ring 14 in place.

In accordance with this invention, the inside diameter of the mating ring 14 is selected to avoid contact with the shaft 20 and to establish a flow path away from the sealing surfaces to carry away any leakage fluid that migrates past the sealing interface. As here embodied the inside diametral surface 42 of the mating seal ring 14 is larger than the inside diametral surface 35 of the seal face 14. It is preferred that the inside diametral surface 42 of the mating seal ring 14 be tapered in the direction away from the bellows seal ring 22 to provide an increasing inside diameter as is illustrated by FIG. 2. It is also preferred that the sealing surface 43 of the seal face 34 which engages the mating ring 14 includes an annular recess 44 extending from the inside diametral surface 35 outwardly. The recess 44 is defined by an annular generally radially directed wall 45 and a generally axially directed wall 46 which preferably inclines outwardly away from the shaft 20. The diameter of the seal face 34 at the seal surface 43 where it meets with the mating seal ring 14 is approximately equal to the inside diameter of the mating seal ring 14 in order to provide a generally conical configuration.

The mating seal ring 14 is made of material which is compatible with that of the bellows seal face 34. While the mating seal ring could be made of ceramic or other suitable materials, it has been found that if the mating ring is made of metal or other heat conductive material, it provides improved heat transfer away from the bellows seal and toward an area where a coolant can be applied to remove the heat or heat will be readily transmitted to the supporting metal housing.

Figure 3:
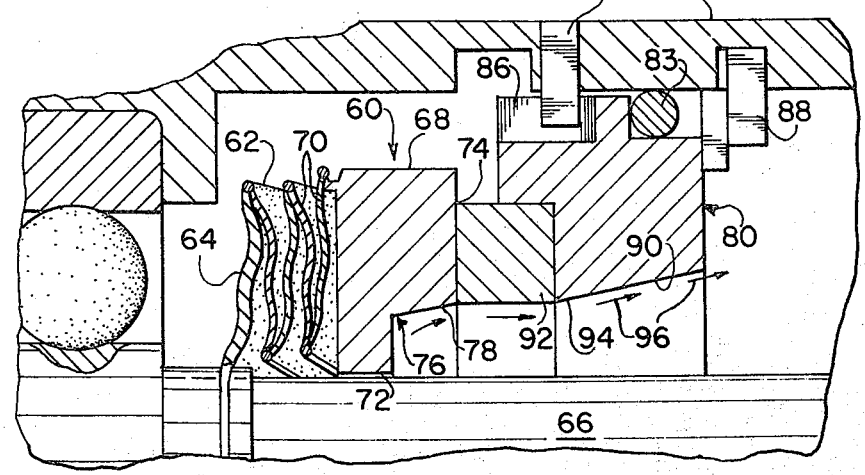
FIG. 3 is a sectional view of a bellows seal formed in accordance with a second embodiment of this invention.

A modified form of the bellows seal of this invention is illustrated in FIG. 3. In accordance with the invention, the modified bellows seat 60 includes a bellows core 62 having a heavy annular end plate 64 attached to the shaft 66 as described above with respect to the first embodiment shown in FIG. 2. A bellows seal ring 68 is attached to the first plate 70 of the bellows core. In order to facilitate attaching the seal ring 68 to the core 62, the seal ring 68 is formed of metal so that it can be welded to the first core plate 70. The bellows seal ring 68 has an inside diametral surface 72 which is slightly larger than the outside diameter of the shaft 66. The relatively close proximity of the bellows seal ring to the shaft 66 provides a damping action to prevent bellows surge or vibration and assumes diametral alignment of the seal surfaces. The axial face 74 of the bellows seal ring is provided with a recess 76 extending upwardly from the inner or pilot diametral surface 72 and includes a tapered outer wall 78 sloping away from the shaft 66 in order to provide a centrifugal force to fluid which migrates into the core and thereby sets up circulation as described above with respect to the embodiment shown in FIG. 2.

The bellows seal 60 also includes a mating seal ring 80 which is mounted within the casing 82 andd is prevented from rotating by the O-ring 83 as described above or by any conventional means, such as an anti-rotation pin 84 set into the casing 82 and received within a recess 86 provided in the mating seal ring 80. The mating seal ring is also retained in place through the use of lock rings 88 on the axial face of the mating ring remote from the bellows seal 60.

The mating ring 80 is a composite ring comprising a metal base portion 80 and a seal face or "wear nose" 92 formed of a material compatible with the metal base 90. For example, the seal face 92 can be formed of carbon graphite. The seal face 92 projects axially from the base 90 and sealingly engages the bellows seal ring 68 at the seal interface 74.

The inside diametral surface 94 of the mating ring 80 is dimensioned and shaped to continue the generally tapered configuration which commences with the recess 76 in the bellows seal ring 68. As can be seen in FIG. 3, this tapered configuration which extends away from the shaft 66 and outwardly from the bellows seal ring 68, provides a self-cleaning centrifugal force by causing a leakage flow path as shown by the arrows 96.

The rotating bellows seal of this invention provides an economical seal which is suitable for use at temperatures exceeding the capabilities of conventional elastomeric seals. The heavy plate which serves to drivingly attach the bellows core to the shaft (plate 24, FIG. 2, and plate 64, FIG. 3) can be formed from the same tooling as are the bellows core plates and is less expensive than previously used means of attaching bellows cores to shafts. Furthermore, the internal geometry of the bellows seal ring and mating seal ring establish a self-cleaning flow which increases the effectiveness and life of the bellows seal. These and other advantages are provided by the bellows seal of this invention.

What is claimed is:

1. A rotating bellows seal comprising an annular bellows core having at one end a single annular end plate for directly drivingly and sealingly attaching said core to a shaft for rotation therewith, a bellows seal ring mounted on the other end of said core, the bellows seal ring including an annular metal member attached to the core and an annular seal face mounted on the metal member, the seal face being formed of a nonmetallic material, the inside diameter of the metal member being larger than the diameter of the inside diametral surface of the seal face, said bellows core being adapted to apply an axial force to sealingly engage said bellows seal face against said mating seal ring, the inside diameter of the mating seal ring at its juncture with said seal face being at least as great as the inside diameter of said seal face at its juncture with said mating seal ring, the inside diameter of the mating seal ring being larger than the diameter of the inside diametral surface of the seal ring for providing a flow path to carry away any leakage fluid from said bellows seal face.

2. A rotating bellows seal as defined in claim 1 wherein said bellows core is formed of a plurality of wave-shaped plates joined together alternately at their outside and inside diametral surfaces and wherein the portion of said annular end plate extending radially beyond said shaft generally has the same surface configuration as said wave-shaped plates.

3. A rotating bellows seal comprising an annular bellows core having means at one end for drivingly and sealingly attaching said core to a shaft for rotation therewith, a bellows seal ring mounted on the other end of said core for rotation therewith, and a mating seal ring adapted to sealingly engage a sealing surface of said bellows seal ring, said bellows seal ring includes an annular recess extending from the inside diametral surface outwardly, the recess being defined by a generally radially directed wall and a generally axially directed wall for establishing a flow path to carry away leakage fluid from said sealing surface, the axially directed wall inclining from said radially directed wall outwardly away from said inside diametral surface to provide a recess of gradually increasing diameter toward said mating seal ring for establishing said flow path to carry away leakage fluid from said sealing surface.

4. A rotating bellows seal as defined in claim 3 wherein said means is a single annular end plate directly attached to said shaft.

5. A rotating bellows seal as defined in claim 4, wherein said bellows core is formed of a plurality of waved shaped plates joined together alternately at their outside and inside diametral surfaces and wherein the portion of said annular end plate extending radially beyond said shaft generally has the same surface configuration as said wave shaped plates.

6. A rotating bellows seal as defined in claim 3 wherein the mating seal ring is formed of heat conductive material.

7. A rotating bellows seal comprising an annular bellows core having means at one end for drivingly and sealingly attaching said core to a shaft for rotation therewith, a bellows seal ring mounted on the other end of said core for rotation therewith, the bellows seal ring inside diameter being slightly larger than said shaft to provide a clearance between said ring and said shaft, and a mating seal ring adapted to sealingly engage a sealing surface of said bellows seal ring, the inside diameter of said mating seal ring adjacent to said bellows seal ring being larger than the diameter of the inside diametral surface of said bellows seal ring and at least a portion of said mating seal ring having an increasing inside diameter tapered in a direction away from said bellows seal ring for providing a flow path to carry away any leakage fluid from said sealing surface.

8. A rotating bellows seal as defined in claim 7 wherein said means is a single annular end plate directly attached to said shaft.

9. A rotating bellows seal as defined in claim 7 wherein said bellows seal ring includes an annular metal member attached to the bellows core and an annular seal face mounted on the metal member, the seal face being formed of a non-metallic material, the inside diameter of the metal member being larger than the inside diameter of the seal face.

10. A rotating bellows seal as defined in claim 7 wherein said bellows seal ring includes an annular recess extending from the inside diametral surface outwardly, the recess being defined by a generally radially directed wall and a generally axially directed wall.

11. A rotating bellows seal as defined in claim 10 wherein the axially directed wall inclines from said radially directed wall outwardly away from said inside diametral surface to provide a recess of gradually increasing diameter toward said mating seal ring.

12. A rotating bellows seal as defined in claim 9 wherein said mating seal ring is formed of heat conductive material.

13. A rotating bellows seal comprising an annular bellows core formed of a plurality of annular wave-shaped core plates joined together alternately at their outside and inside diametral surfaces, a single annular end plate of heavier gage than said core plates joined to one axial end of said core, said end plate being directly and drivingly mounted on a shaft for rotation therewith, a bellows seal ring mounted on the other end of said core and comprising a metal member attached to the core and a seal face attached to the metal member, the seal face being of non-metallic material and having an inside diametral surface of smaller diameter than the inside diameter of said metal member, a mating seal ring being formed of heat conductive material and adapted to sealingly engage a sealing surface of said bellows seal ring, said mating seal ring having an increasing inside diameter tapered in a direction away from said bellows seal ring for providing a flow path to carry away any leakage fluid from said sealing surface.

14. In combination, a shaft rotatably mounted within a chamber, a rotating bellows seal to minimize leakage from said chamber, said seal comprising an annular bellows core formed of a plurality of annular wave-shaped core plates joined together alternately at their outside and inside diametral surfaces, a single annular end plate of heavier gage than said core plates joined to one axial end of said core, said end plate being directly and drivingly attached to said shaft to rotate therewith, a bellows seal ring mounted on the other end of said core and having an annular sealing surface, a stationary mating seal ring sealingly engaging said sealing surface, said mating seal ring having an increasing inside diameter which is larger than the inside diametral surface diameter of said bellows seal ring and which is tapered in a direction away from said bellows seal ring for providing a flow path to carry away any leakage fluid from said sealing surface.

15. The combination as defined in claim 14 wherein said bellows seal ring includes an annular recess extending from the inside diametral surface outwardly, the recess being defined by a generally radially directed wall and a generally axially directed wall, said axially directed wall inclining from said radially directed wall outwardly away from said inside diametral surface to provide a recess of gradually increasing diameter toward said mating seal ring for establishing a flow path to carry away leakage fluid from said sealing surface.

16. The combination as defined in claim 13 wherein said seal face includes an annular recess extending from the inside diametral surface outwardly, the recess being defined by a generally radially directed wall and a generally axially directed wall, said axially directed wall inclining from said radially directed wall outwardly away from said inside diametral surface to provide a recess of gradually increasing diameter toward said mating seal ring for establishing a flow path to carry away leakage fluid from said sealing surface.

* * * * *